Jan. 18, 1927.

I. L. MILTON 1,615,130

MEANS FOR ADJUSTING ELECTRICAL INDUCTANCES

Filed Oct. 22, 1924

Inventor:
Ivan L. Milton
by　　　　Atty

Patented Jan. 18, 1927.

1,615,130

UNITED STATES PATENT OFFICE.

IVAN LESLIE MILTON, OF WESTERN SPRINGS, ILLINOIS, ASSIGNOR TO WESTERN ELECTRIC COMPANY, INCORPORATED, OF NEW YORK, N. Y., A CORPORATION OF NEW YORK.

MEANS FOR ADJUSTING ELECTRICAL INDUCTANCES.

Application filed October 22, 1924. Serial No. 745,171.

This invention relates to means for adjusting electrical inductances, and more particularly to a method of and means for balancing coupled electrical inductances.

The object of the invention is to provide a simplified and relatively inexpensive means for accurately adjusting the characteristics of an electrical coil.

In one embodiment of the invention, coupled electrical inductances constituting a retardation coil having a plurality of windings are balanced by a flexible strip of magnetic material disposed around the coil in such manner that the weaker inductance is sufficiently strengthened to effect a balance between the inductances.

Other features of the invention will become apparent as the detailed description progresses, reference being had to the accompanying drawings, wherein Fig. 1 is a plan view of a retardation coil comprising a plurality of inductances which have been balanced in accordance with the improved method;

Figure 1:
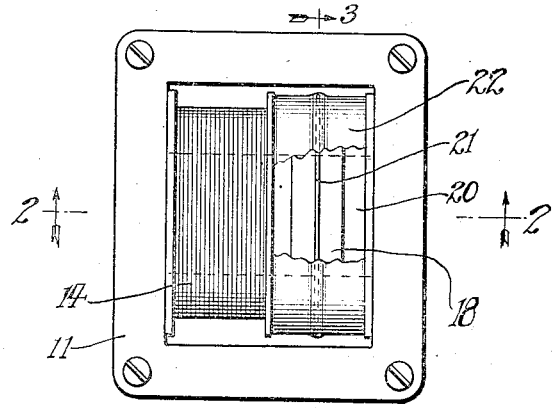
Figure 2:
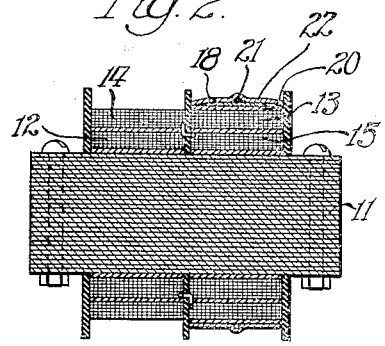
Fig. 2 is a section taken on line 2—2 of Fig. 1.
Figure 3:
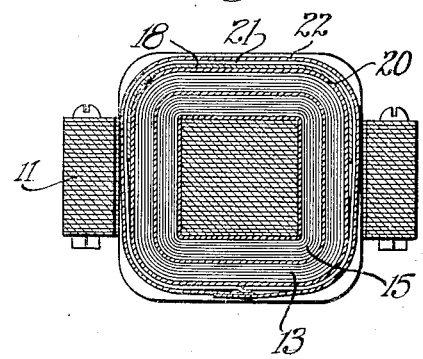
Fig. 3 is a section taken on line 3—3 of Fig. 1.
Figure 4:
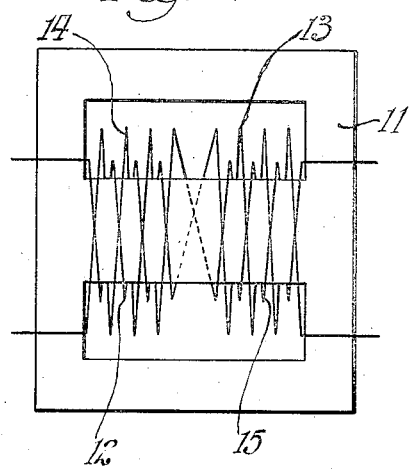
Fig. 4 is a diagrammatic view illustrating the manner in which the coil shown in Fig. 1 is wound.
Figure 5:
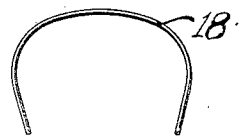
Fig. 5 is a view of the improved means employed to balance the coil shown in Fig. 1.

It is believed that a complete understanding of the improved method will be procured from the following description of a device whereby the method may be practiced.

In the drawing, a device embodying the invention is shown in connection with a retardation coil comprising a plurality of coupled inductances which are balanced by the improved device, the retardation coil being of the type which is usually employed in testing sets adapted to indicate the amount of cross-talk in telephone circuits or the like. The coil comprises a shell type transformer core 11 and windings 12, 13, 14, and 15. The windings 12 and 13 are in series and the several turns thereof are wound in a single direction, the turns of the windings 14 and 15 being wound in the opposite direction and being in series with each other. The windings 12, 13, 14, and 15 are so arranged upon the core 11 and are so designed that the inductance which comprises the windings 12 and 13 should balance the inductance formed by the windings 14 and 15. It is imperative that this balance should be obtained within very close limits of error if the test set in which the coil is to be used is to function satisfactorily. In practice, however, the inductances are sometimes found to be unbalanced to a point beyond these limits, but not unbalanced to such a degree that the condition can be remedied by the addition of or the removal of a turn to or from either one of the inductances. In the coil shown in the drawing the inductance comprising the windings 12 and 13 is understood to be the weaker inductance for the purposes of this disclosure.

The improved device employed to balance the inductances comprises a flexible U-shaped strip 18 which preferably consists of silicon steel and which may be easily and quickly secured to the core in such manner that it affects the weaker inductance to a greater extent than it does the other. Thus, in the drawing, the strip 18 is disposed around the coil in close proximity to the winding 13 and increases the susceptance of the magnetic circuit peculiar to the inductance of which this winding forms a part to a greater extent than it does the susceptance of the magnetic circuit peculiar to the inductance. The strip is so applied to the coil that it does not form a complete turn around it as an electrical current or currents would then be induced in the strip. The strip preferably comprises insufficient magnetic material to affect the coil to the extent that the addition or removal of a turn to or from the coil would do, but does contain sufficient magnetic material to enable the tester to so place it on the coil that the unbalanced condition will be corrected, it being understood the strip 18 may be moved along the winding 13 in either longitudinal direction to vary its influence on that winding. In this embodiment of the invention, it is also the practice to provide strips 18 of different lengths so that one may be selected which will meet the particular conditions obtaining in a given coil unless the inductances are unbalanced to such a degree that two or more strips must be used.

In the preferred embodiment of the invention the insulation of the winding to which the strip 18 is to be applied is first protected. Thus in the drawing, a band 20 of tape or the like is first wrapped around the winding 13. The strip 18 is then correctly positioned upon the band 20 and secured in place thereon by a thread 21 tied tightly around the strip and coil, after which the strip is covered by a second band 22 of tape.

What is claimed is:

1. The combination with coupled electrical inductance coils having a fixed core, of magnetic material around one of the coils to differently affect the inductances.

2. In a variable inductance unit, the combination with a coil, of an incomplete band of magnetic material placed around the coil and shorter than the coil to permit variation of the inductance by longitudinal movement along the coil.

3. The combination with coupled electrical inductance coils, of an incomplete turn of magnetic material around one of the coils to balance the inductances.

4. The combination of adjustable, coupled, electrical inductance coils having a fixed core of magnetic material, with additional magnetic material for affecting one of the inductances to a greater extent than the other, the amount of magnetic material being such as to produce a lesser effect than the removal of one turn from either inductance.

5. An inductance unit comprising coupled electrical inductances having a fixed core, and magnetic material spaced from the core around one of the inductances to balance the inductances.

6. In a variable inductance unit, the combination with a coil, of a quantity of magnetic material formed into an incomplete turn around the coil to change the susceptance of its magnetic circuit.

7. The combination with coupled electrical inductances, of magnetic material formed around one of the inductances and adapted to balance them.

8. The combination with coupled electrical inductances, of a relatively small amount of magnetic material so disposed around one of the inductances that it affects one of them to a greater extent than the other.

9. The combination with coupled electrical inductances, having a fixed core of magnetic material, of a relatively small amount of magnetic material so disposed around one of the inductances that it affects one of them to a greater extent than the other.

10. The combination with coupled electrical inductances, of means for adjusting the inductances comprising a flexible strip of magnetic material associated with the inductances in such manner that one of them is affected to a greater extent than the other.

11. The combination with a coil, of a flexible strip of magnetic material disposed around the coil to increase the susceptance of its magnetic circuit.

12. The combination with a coil, of a flexible strip of magnetic material disposed in close proximity to an outer surface of the coil to increase the susceptance of its magnetic circuit.

In witness whereof, I hereunto subscribe my name this 9th day of October A. D., 1924.

IVAN LESLIE MILTON.